United States Patent [19]

McDowell

[11] Patent Number: 4,599,174
[45] Date of Patent: Jul. 8, 1986

[54] SUBMERGED FIXED FILM BIOLOGICAL TREATMENT SYSTEM

[75] Inventor: Curtis S. McDowell, Allentown, Pa.

[73] Assignee: Polybac Corporation, Allentown, Pa.

[21] Appl. No.: 583,778

[22] Filed: Feb. 27, 1984

[51] Int. Cl.[4] ............................................. C02F 3/06
[52] U.S. Cl. ...................................... 210/614; 210/615; 210/629
[58] Field of Search ............... 210/615, 150, 151, 621, 210/622, 614, 629

[56] References Cited

U.S. PATENT DOCUMENTS

| | | | |
|---|---|---|---|
| 3,235,234 | 2/1966 | Boaudoin | 261/24 |
| 3,415,502 | 12/1968 | Munters | 261/112 |
| 3,450,393 | 6/1969 | Munters | 261/112 |
| 3,502,596 | 3/1970 | Sowards | 210/150 X |
| 3,563,888 | 2/1971 | Klock | 210/14 |
| 3,576,316 | 4/1971 | Kaelin | 261/91 |
| 3,773,660 | 11/1973 | Hopwood | 210/8 |
| 3,785,620 | 1/1974 | Huber | 259/4 |
| 3,878,097 | 4/1975 | Mochizuki et al. | 210/151 |
| 3,947,532 | 3/1976 | Kold | 261/112 |
| 3,966,599 | 6/1976 | Burkhead | 210/14 |
| 3,966,608 | 6/1976 | Mason | 210/151 |
| 4,045,344 | 8/1977 | Yokota | 210/17 |
| 4,231,863 | 11/1980 | Sutphin | 210/615 |
| 4,238,338 | 12/1980 | Klinzer | 210/195.6 |
| 4,296,050 | 10/1981 | Meier | 261/112 |
| 4,303,600 | 12/1981 | Roe | 261/112 |
| 4,374,730 | 2/1983 | Brahn et al. | 210/608 |
| 4,411,780 | 10/1983 | Suzuki et al. | 210/615 X |

Primary Examiner—Thomas Wyse

[57] ABSTRACT

This invention pertains to a submerged fixed-film biological distribution system. It includes a plurality of vertical chambers adjacent each other having corrugated packings therein. Air or oxygenating gas is introduced at the bottom of select alternating chambers so that an upflowing liquor is generated in those chambers and a downflowing liquor generated in the adjacent chambers. Contaminated waste is biologically digested by microorganism retained on the corrugated packings, such digesting occurring in all chambers.

12 Claims, 3 Drawing Figures

SUBMERGED FIXED FILM BIOLOGICAL TREATMENT SYSTEM

TECHNICAL FIELD

This invention pertains to the treatment of waste in a submerged fixed film biological digestion system.

BACKGROUND OF THE INVENTION

A wide range of methods and apparatus are known and have been widely utilized in the fixed biological film aerobic treatment of aqueous liquors containing biodegradable waste products to provide a purified and safe effluent for return to the environment. As is known, the term "fixed film" refers to those systems where the microorganisms are attached to the surface of a solid inert material as opposed to being freely suspended as agglomerated particles in a liquid medium.

There are basically three general categories of fixed film aerobic treatment processes, a submerged system, in which the fixed film is submerged in aqueous liquor, a trickle bed system in which the fixed film is exposed to the atmosphere and aqueous liquors trickled over the film and a combination of the latter in which the fixed film is alternately immersed in an aqueous liquor and then exposed to air as is done in rotating biological contactors. In the submerged fixed film category the microorganisms can be attached either to the surface of immobile solid matrices or to mobile solid particles submerged in an aqueous liquor. In aerobic versions of submerged fixed film systems large volumes of air are bubbled through the mixture of aqueous liquor and fixed film microorganisms.

Representative patents which illustrate the submerged aerobic fixed film immobile matrix type systems for effecting biological oxidation of waste products are shown in the following patents.

U.S. Pat. No. 3,966,608 illustrates a submerged technique for biologically treating waste products. The treatment zone utilizes a central column and adjacent oxidation zones in fluid communication with the central column. An aerating fan is located at the top of the central column to draw the liquor upwardly through the central column and the aerated waste sprayed outwardly to effect aeration thereof and then caused to flow downwardly through the adjacent columns containing submerged packing, such as Raschig or Pall rings. The microorganisms which are fixed to the packing effect oxidation of the waste.

U.S. Pat. No. 3,235,234 illustrates a submerged technique for treating waste wherein a treatment zone is immersed in a tank containing waste, the treatment zone being filled with a porous packing such as saddles, wire mesh or corrugated sheets, defining a serpentine path in the vertical direction. An oxygenating gas is introduced through a diffuser, such as a sparge unit, placed beneath the packing. Both waste and oxygenating gas are forced upwardly through the packing unit and the waste biologically digested. The treated waste then overflows into the tank.

U.S. Pat. No. 4,231,863 illustrates the treatment of waste via a submerged technique. In that process a plurality of tubular materials are vertically extended within the treatment zone and an oxygenating gas introduced directly below the openings of each of the vertically extended tubes. The introduction of the oxygenating gas causes waste to flow upwardly through the tubes and then out and downwardly over the exterior surface of the tube, Micoorganisms supported on the tubes effect oxidation of the waste.

U.S. Pat. No. 3,563,888 and U.S. Pat. No. Re. 27,721 illustrate a variation in the submerged technique for waste treatment, such as described in U.S. Pat. No. 3,966,599 except that in the '888 case an oxygenating gas is introduced near the bottom of the central column thereby creating an airlift to circulate waste liquor.

Other examples of treatment systems are shown in U.S. Pat. Nos. 4,374,730; 4,045,344; 3,576,313; 3,773,660, 3,956,128; and 4,238,338.

SUMMARY OF THE INVENTION

This invention pertains to an improved submerged aerobic fixed film immobile matrix process for the treatment of aqueous liquor containing biodegradable waste products. The improvement in the process resides in first establishing a plurality of vertically extending chambers with each chamber being in fluid communication with the other at both the top and bottom ends and filled with a corrugated packing, the corrugations defining a serpentine pathway in the vertical direction. Next, an oxygenating gas is introduced into the bottom of at least one of the vertically extending treatment chambers, wherein both the oxygenating gas and liquor are forced upwardly through the vertically extending chambers and contacted with microorganisms supported on the packing. Lastly, a portion of oxygen rich, undigested waste is removed from the top of the chamber and returned downwardly through an adjacent treatment zone where it undergoes further oxidation by virtue of its contact with a packing carrying microorganisms upon its surface. In a preferred mode of operation the volume of the adjacent chamber carrying the downwardly flowing oxygen rich undigested waste is adjusted by design so that the dissolved oxygen (DO) content of the liquor exiting the lower end of the chamber is less than about 2 ppm and preferably near zero. The oxygen depleted liquor again enters an upflow aerated vertically extended treatment chamber. Because of the low DO concentration at entry it is efficiently aerated to an oxygen rich state.

This invention also pertains to apparatus suited for the treatment of industrial and domestic waste or sewage utilizing the submerged process described above.

There are numerous advantages associated with the process and apparatus utilizing the submerged aerobic fixed film immobile matrix treatment system of this invention and some of these advantages are as follows:

there is an ability to achieve high rates of oxygen transfer and high concentrations of dissolved oxygen in the liquor thereby achieving high rates of biological oxidation of the waste;

there is an ability to biologically utilize substantially all of the dissolved oxygen transferred to the liquor in efficient manner;

there is an ability to compress the size of the treatment system and thereby maximize throughput within the volume constraints of the treatment system, and;

the system can be operated essentially plug flow thereby minimizing back mixing of liquor and widening the concentration gradient width as well and minimizing straight through flow of inlet undigested waste.

THE DRAWINGS

DETAILED DESCRIPTION OF THE INVENTION

Figure 1:
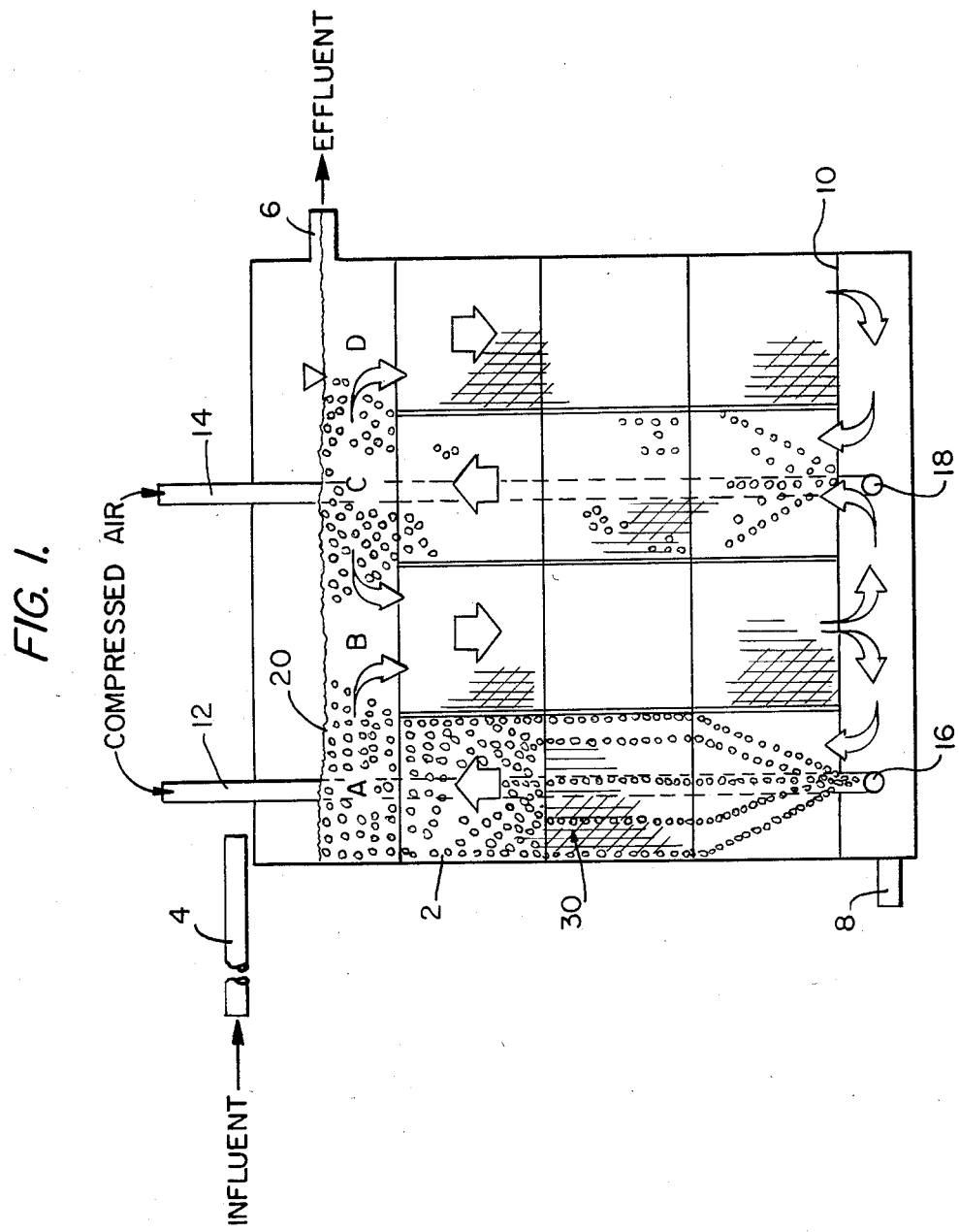
FIG. 1 is a view in cross-section and elevation of a submerged fixed film biological treatment system.

To facilitate an understanding of the apparatus used for effecting biological oxidation of waste products, reference is made to FIG. 1. The submerged aerobic fixed film immobile matrix biological treatment system includes an elongated container 2 having an inlet 4 for the introduction of waste influent and effluent line 6 for the removal of digested effluent. A drain 8 is located near the bottom of the container 2 and may be used for the continuous removal of sediment and solid material or to provide for periodic cleaning. A plurality of vertically extended chambers A, B, C and D are established within the chamber by the utilization of corrugated packing materials which are supported upon a grid 10. Each vertically extending chamber, A, B, C and D, is in fluid communication with each other only at their upper and lower ends. In this way fluid can flow horizontally from one chamber to the next at either the top or bottom end portions. The vertical extending chambers are separate and distinct from each other at all points so that there is no fluid flow in a horizontal direction between the chambers at any point, except at the openings at the upper and lower ends.

Aeration is effected through conduits 12 and 14 which extend downwardly through chambers A and C respectively and terminate in air distributors or gas diffusers 16 and 18. The diffusers 16 and 18 are typically inserted in alternating chambers so that the direction of fluid flow in adjacent chambers in counter-current to the direction of flow within the aeration chambers. For example, as shown in FIG. 1, the direction of flow is downward in chambers B and D and counter-current to the upward direction of flow in chambers A and C. The alternating flow pattern from inlet to outlet also prevents substantial amounts of untreated waste from passing straight through the system and without microorganism contact in the chambers. The diffusers 16 and 18, which initiate the direction of flow in chambers A and C, generally are sparge units which permit the introduction of dispersed bubbles of oxygenating gas into the liquid media. These sparge units typically will have a plurality of uniformly distributed perforations of about 1/32 to ¼ inch in diameter such that the linear velocity of air through the perforation is at least 25 ft/sec but not more than about 150 ft/sec. When the diameter of the perforations in the unit is reduced substantially relative to the air flow and linear velocities of greater than 150 ft/sec are used, the energy costs are unduly increased due to the increase in pressure requirements. On the other hand if the perforations are too large relative to the air flow and the linear velocity of air through the perforation is below about 25 ft/sec., it may be difficult to achieve good distribution of air through all the perforations and thereby good distribution through the chamber. Another technique suited for effecting aeration in the chamber is to introduce air through a submerged agitation system such as a centrifugal pump coupled with an ejector.

It is known that the effectiveness of an aerobic treatment process is influenced by (a) the quantity of bacterial cells or microorganisms which act upon the biologically degradable waste and (b) the availability of energy necessary for these organisms to function. The rate at which the microorganisms attack the waste product and the concentration of the microorganisms within the digesting zone are influenced by the availability and concentration of oxygen within the zone. Therefore, one of the limiting factors in the aerobic treatment of waste is caused by the inherent mass transfer limitation in dissolving an oxygen bearing gas in an aqueous medium at high rates and in high concentration for utilization by the microorganisms.

To facilitate mass transfer of oxygen to the aqueous medium, each vertically extending chamber within the treatment system is filled with a rigid, porous packing or matrix modules capable of supporting microorganism growth. These packings are supported by grid 10 and are provided to encourage gas-liquid contact at the site of the microorganisms and to support a high concentration of microorganism growth.

Figure 2:
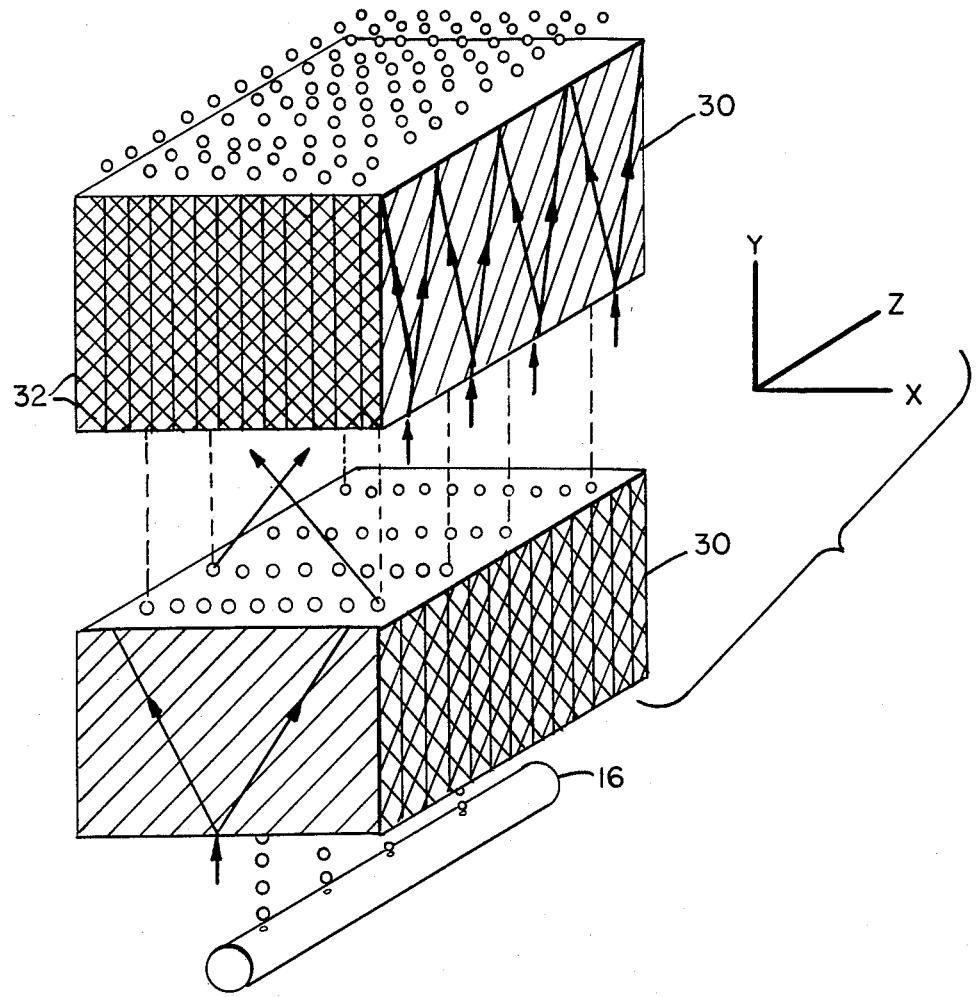
FIG. 2 is a view in an oblique view showing the rise of liquor and air flow through stacked packing modules in the vertical extending chambers.
Figure 3:
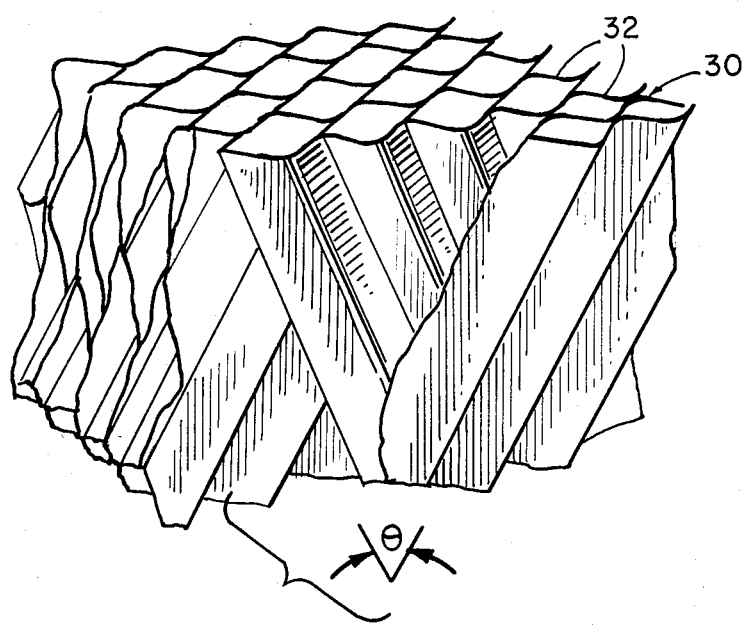
FIG. 3 shows a view of the corrugations in a packing element and illustrating the directional dispersion effected by the packing.

Referring to FIGS. 2 and 3, the packings 30, usually in the form of blocks one or two foot high are formed from thin layers or lamellas 32 of polyvinyl chloride or polypropylene which are in contact with each other and are corrugated or fluted to provide a high surface to volume ratio, e.g., 20–70 sq. ft. per cubic foot. Often perforations are introduced into the lamellas to improve distribution and mixing between the gas and liquor. These lamellas are generally sequentially arranged and each is oriented at an angle ($\theta$) different from adjacent lamellas within the packing, e.g. 30°–60° (preferably 45°) and corrugated so as to define an alternating serpentine pathway or channel in the general direction of flow. These packings when placed in the vertical columns over the air diffusers retard the flow of liquid and gas and they effect a shearing of large gas bubbles into small bubbles. These two factors provide an efficient and increased opportunity for transfer of oxygen from the oxygenating gas into the aqueous phase.

Normally a plurality of packing blocks or matrix modules are stacked one on top of the other within each vertically extending chamber and angularly positioned so that the lamellas relative to the direction of flow, cross as indicated by the arrows (FIG. 2). For preferred operation, the lamellas of the individual packing blocks above or below a given block are offset by rotation at an angle relative to the y axis of about 90°, although other offset angles e.g. 60°–80° can be utilized. In this way, liquor and oxygenating gas will be uniformly distributed along both horizontal axis, i.e. x and z of the given vertical column. Examples of packing materials suited for utilization in the vertically extending chambers A, B, C, and D are set forth in U.S. Pat. Nos. 3,785,620; 4,296,050; 3,947,532; 3,450,393; 3,415,502; and 4,303,600 which are incorporated by reference.

In operation, container 2 is filled with a domestic or industrial waste, which is capable of being biologically treated, through inlet 4 to liquid level 20 extending above the packings in vertically extending chambers A, B, C and D. Typically, for efficient design considerations, the height of this liquid column ranges from about 3 to 10 feet or more. A plurality of packing blocks 30 are placed in crisscross arrangement in the vertical direction on grid 10. These packing blocks are approximately 1 to 6 feet in width, (see x axis FIG. 2) 1 to 2 feet in height (y axis), and 1–12 feet (z axis). They are stacked angularly offset from each other. By alternating the orientation of the lamellas for each layer of packing blocks in adjacent chambers A, B, C, or D, the vertical side (y axis) of each vertical chamber A, B, C, or D, is effectively sealed so that impervious vertical wall baffles may be omitted for separating each of the chambers. Otherwise, wall baffles would have to be used to prevent horizontal communication between the chambers.

An oxygenating gas, e.g., oxygen, air, or an oxygen enriched system, i.e., those containing more than 20% oxygen is introduced through conduits 12 and 14 and subsequently through diffusers 16 and 18 directly under vertically extending chambers A and C. The flow rate of oxygenating gas is adjusted under chambers A and C so that there is sufficient displacement of water by oxygenating gas in the vertical column to cause an air lift effect and result in an upward movement of liquor of about 0.05 to 0.5 feet/sec through the packing material. As the upwardly flowing gas and liquor contact the packing material 30, the bubbles are sheared into smaller bubbles and uniformly distributed within the packing. These smaller bubbles have a collectively larger surface area and dissolution rates of oxygen, which are a function of the interfacial surface area meter$^2$/meter$^3$ ($M^2/M^3$), are increased. Increased rates of oxygen dissolution permits accelerated biological digestion of the waste. With the establishment of an air lift in chambers A and C, a corresponding downward flow pattern is established in adjacent chambers B and D respectively. The effluent from downward flowing chambers B and D is then returned to a chamber having an upwardly flowing liquor as shown in FIG. 1.

Sufficient oxygenating gas is provided in chambers A and C to produce an oxygen rich undigested liquor at the upper portions of the chambers. Any excess gas will escape into the atmosphere above the liquid level 20. It is important to maintain sufficient oxygen within chambers A and C so that an oxygen rich liquor of at least 2.0 to 5.0 ppm dissolved oxygen is established at the top of chambers A and C. This level insures that sufficient oxygen is present in chambers A and C to maintain and supply energy for a high microorganism growth. The oxygen rich, partially digested liquor at the top of columns A and C then passes horizontally to chambers B and D and flows downwardly through vertical columns B and D where the partially digested liquor can contact another high concentration of microorganism growth supported on the packing material. Because the partially digested liquor is oxygen rich, a high concentration of microorganism growth is sustained in chambers B and D and biological digestion occurs. Simultaneously the dissolved oxygen level in the liquors is depleted substantially as the liquor flows downwardly through the packing material. In an effort to maximize the efficiency of the treatment system in terms of oxygen dissolution capacity within the space constraints of container 2, it is preferable to design the volume of the downward flowing chambers and hence the downard linear velocity of the liquid and hence time of passage through the matrix so that depletion of dissolved oxygen in the downward flowing liquor is substantial and approaches 1 to 2 ppm at the lower extremities of the column. By appropriately adjusting the flow rate of liquor through zones B and D, i.e., by adjusting the volume of these zones, oxidation can occur in both zones A and C as well as in B and D at very effective rates. As mentioned previously an advantage of the present system is that the liquor which enters the lower extremities of columns A and C will enter the aerator zones of these columns at low dissolved oxygen concentration. The rate of oxygen dissolution in the liquor is greatest when the dissolved oxygen is low and hence reaeration of the upflowing liquor in columns A and C is uniquely efficient.

The above process of cycling liquor continuously through vertically extending chambers A, B, C, and D is repeated until complete biological oxidation has occurred or oxidation has been completed to a preselected level. The biologically digested waste comprising the effluent of the process is then removed from the upper part of the vertically extending chamber D through effluent outlet 6. It is then returned to the environment or is further treated in another process as necessary to removed solids, refactory organics or harmful bacteria.

After continued usage for an extended period of time, solid material may accumulate within the packing or accumulate in the corners of container 2. The velocity of the fluid or liquor is controlled at or near the bottom of container 2 by designing appropriate clearances between the bottom of the packing unit. Desired velocities are at $>0.5$ and $<2.0$ ft/sec and these aid in keeping the solids suspended. Liquor and some solid material can be removed through drain 8 as desired.

The following example is provided to illustrate a preferred embodiment of the invention.

EXAMPLE 1

A submerged biological treatment system was designed in the general configuration shown in FIG. 1 to handle 25 pounds BOD per day of a hydrocarbon contaminated waste. The container was internally 8'8" feet high, 7½ feet in width and 10 feet in length. In contrast to FIG. 1 the container was divided into 5 vertical chambers by installing 5 rows of corrugated packing having a plurality of lamellas supplied be Mauters Corporation and sold under the designation Biodek ®B19060. Each packing block in each vertical chamber was 1 foot in depth (y axis reference FIG. 2), 2 foot in width (x axis) and 7½ feet in length (z axis) and six packing blocks or layers were stacked one on top of the other with the lamellas of each layer offset at 90° angles to each other. The packing blocks were supported on a grid about 9 inches from the floor and then immersed in contaminated liquor. A total depth of about 7½ feet of liquor was maintained in the container this providing about 9 inches of liquor above the packings. Diffusers were installed in 3 of the 5 chambers alternating from one end, e.g. chambers A, C, and "E" if using FIG. 1 designation. The three diffusers contained 60 holes approximately 3/16 inch in diameter i.e. 20 holes uniformly distributed along the length of each diffuser extending under each upflow chamber.

A hydrocarbon contaminated water containing about 120 BOD in mg/l was introduced into the container at the top and at an end of the container at the rate of 20,000 gal. per day. Air was injected into the diffuser system at the rate of 70 ft$^3$/min or about 23.3 ft$^3$/min in each diffuser. This level of air injection provided 1.55 ft$^3$ air/ft$^2$ of upflow chamber surface area/minute. Measurements showed that these packings were effective in retarding air flow in that measurements indicated that about 5.5 ft$^3$ of air was trapped within the three chambers having upflowing liquor. Dissolved oxygen contents at the top of the columns were typically in excess of 2 ppm. Treated effluent was recovered from the outlet and was environmentally acceptable. Tests for oxygen transfer efficiency with the above system showed that oxygen/horsepower hour efficiencies of 2.2 lbs O$_2$/hp hr can be achieved under standard test conditions.

What is claimed is:

1. In an aerobic process for treating an aqueous liquor containing a biodegradable waste product wherein the liquor is introduced into a container and the waste product biologically digested as it is passed through the container from an inlet to an exit, said biological digesting being accomplished by contacting the liquor with an oxygenating gas in the presence of a submerged porous mass supporting aerobic microorganisms;

the improvement for effecting efficient oxygen transfer and utilization which comprises:

establishing and maintaining at least a first and second vertically extending chamber within said tank, said chambers being in fluid communication with each other at the upper and lower ends;

establishing and maintaining a corrugated packing within said first and second chambers, said corrugated packing having channels defining a serpentine pathway in the vertical direction;

passing liquor and oxygenating gas upwardly through said corrugated packing in at least one of said first vertically extending chambers generating an oxygen rich liquor whereby a portion of the waste product is biologically digested by microorganisms supported on said corrugated packing, and;

returning a portion of oxygen rich undigested liquor from said first chamber downwardly through said second vertically extending chamber and in contact with microorganisms supported by the packing and then returning a portion of the liquor into a first chamber.

2. The process of claim 1 wherein said packing within said first and second chamber is comprised of a plurality of packing elements stacked one on top of the other.

3. The process of claim 2 wherein each packing element includes a plurality of lamellas in contact with each other and in parallel relation to their longitudinal axis, each lamella having corrugations thereon with the corrugations of sequentially arranged lamellas being oriented in different directions.

4. The process of claim 3 wherein the corrugations of at least one of two sequentially arranged lamellas relative to the direction of flow are exposed at an angle to the longitudinal flow of waste liquor through the chamber.

5. The process of claim 4 wherein the packing element in each vertical chamber are angularly offset to the packing elements in an adjacent chamber at an angle of not more than 90°.

6. The process of claim 5 wherein the inlet for aqueous liquor is near an upper portion of the tank and adjacent to a first vertically extending chamber having an upwardly flowing liquor.

7. The process of claim 6 wherein the exit is at an opposite end from said inlet and near an upper portion of said container.

8. The process of claim 4 wherein the velocity of the liquor at floor of said tank is maintained in excess of 0.5 ft/min. in order to maintain the solids in suspension.

9. The process of claim 4 wherein the velocity of the liquor as it flows upwardly or downwardly in said chambers is maintained at a level from 0.05 to 0.5 ft./second.

10. The process of claim 9 wherein the flow of said liquor through said second chamber is adjusted such that the dissolved oxygen content of liquor exiting said second chamber and returned to an upwardly flowing chamber is below 2 ppm.

11. The process of claim 5 where said packing elements are angularly offset from each other at an angle from 60–90 degrees from each other.

12. The process of claim 11 wherein adjacent lamellas of each corrugated packing element cross at an angle from 30 to 60 degrees.

* * * * *